UNITED STATES PATENT OFFICE.

ANTHONY GORSKI, OF AMSTERDAM, NEW YORK.

MUSTARD APPETIZER.

1,010,252.　　　Specification of Letters Patent.　Patented Nov. 28, 1911.

No Drawing.　　Application filed January 13, 1910. Serial No. 537,859.

*To all whom it may concern:*

Be it known that I, ANTHONY GORSKI, a citizen of the United States, residing at Amsterdam, in the county of Montgomery and State of New York, have invented certain new and useful Improvements in Mustard Appetizers, of which the following is a specification.

This invention relates to food compounds or relishes, and the principal object of the same is to produce a mustard that will be pleasing to the taste, healthful, and one in which the ingredients used are of such nature that the mustard will retain its flavor and wholesomeness.

In the production of the improved mustard it will be understood of course that the proportions of the ingredients and the method of mixing the same may be varied, but the following has been found to be a satisfactory and efficient manner of producing the same:—Dry mustard powder, one half pound; yolks of three or four hard boiled eggs; pure olive oil, six ounces; sugar, four ounces; juice of four lemons; boiling water, ten and one-half ounces.

The yolks are preferably from chicken eggs and are cooled and then triturated, and while being triturated, the olive oil is poured in a little at a time. The lemon juice is then gradually added and the mustard powder is also gradually added, the ingredients being constantly mixed. A small portion of the boiling water is then added, the mixing of the ingredients being continued, and then the balance of the ingredients are gradually added a little at a time, the mixing of the same being continued for one and a half or two hours after all have been added to assure of a thorough trituration of the ingredients.

It has been found advisable to mix the ingredients in a deep bowl having a polished inner surface, and the triturating of the same should be performed by using a wooden roller or pestle.

The resulting compound should be packed in glass jars and corked air-tight, the cork being wrapped in waxed paper which may be sealed with tin foil for commercial use. And to preserve the taste, strength and freshness of the mustard, it should be kept in cool places and always sealed when not in use.

What I claim as my invention is:—

1. The herein described composition for food consisting of mustard powder, yolks of hard boiled eggs, pure olive oil, sugar, lemon juice, and water, said parts being mixed together substantially in the proportions described.

2. The herein described composition consisting of about one half pound of dry mustard powder, yolks of three or more hard boiled eggs, six ounces of pure olive oil, four ounces of sugar, juice of four lemons and ten and one half ounces of water, said parts being thoroughly mixed together substantially as described.

In testimony whereof I hereunto affix my signature in presence of two witnesses.

ANTHONY GORSKI.

Witnesses:
　JAMES JACETT,
　OTTON JAN GORSKI.